United States Patent [19]

Beardmore

[11] 4,357,837
[45] Nov. 9, 1982

[54] DYNAMICALLY TUNED GYROSCOPES

[75] Inventor: Geoffrey Beardmore, Cheltenham, England

[73] Assignee: Smiths Industries Public Limited Company, London, England

[21] Appl. No.: 200,793

[22] Filed: Oct. 27, 1980

[30] Foreign Application Priority Data

Nov. 16, 1979 [GB] United Kingdom ............... 7939726

[51] Int. Cl.³ .................... G01C 19/08; G01C 19/22
[52] U.S. Cl. ................................ 74/5 F; 74/5.46; 74/5.6 E; 74/5.7
[58] Field of Search .............. 74/5 F, 5.46, 5.47, 74/5.6 E, 5.6 D, 5.7, 5.4; 308/DIG. 1, 2 A

[56] References Cited

U.S. PATENT DOCUMENTS

| | | | |
|---|---|---|---|
| 3,301,073 | 1/1967 | Howe | 74/5.7 |
| 3,318,160 | 5/1967 | Erdley et al. | 74/5.4 |
| 3,438,270 | 4/1969 | Binder et al. | 74/5.47 |
| 3,463,016 | 8/1969 | Erdley et al. | 74/5.4 |
| 3,543,301 | 11/1970 | Barnett | 74/5 F |
| 3,678,765 | 7/1972 | Feldman | 74/5.46 |
| 3,702,569 | 11/1972 | Quinn et al. | 74/5.47 |
| 3,726,572 | 4/1973 | Beardmore | 308/DIG. 1 |
| 4,286,370 | 9/1981 | Craig | 308/2 A X |

FOREIGN PATENT DOCUMENTS

| | | |
|---|---|---|
| 1310523 | 3/1973 | United Kingdom . |
| 1310524 | 3/1973 | United Kingdom . |
| 1310525 | 3/1973 | United Kingdom . |
| 1310526 | 3/1973 | United Kingdom . |
| 1545774 | 5/1979 | United Kingdom . |

Primary Examiner—Rodney H. Bonck
Attorney, Agent, or Firm—Pollock, Vande Sande & Priddy

[57] ABSTRACT

Gyroscope apparatus includes a tubular rotor that is supported at opposite ends by bearings, such as a gas-lubricated bearing, for rotation about its axis. A gimbal ring encircles the rotor and is resiliently supported with the rotor, for angular displacement about an axis at right angles to the rotor axis, by a pair of flexure pivots located intermediate the ends of the rotor. An inertia ring is mounted concentrically with the gimbal ring by another pair of flexure pivots for angular displacement about an axis at right angles to the rotor axis and the axis of displacement of the gimbal ring. The major part of each flexure pivot is contained within the radial thickness of the gimbal ring. Displacement of the inertia ring is sensed by pick-offs the outputs of which are used to control the restoring torque applied by torquers located outwardly of the pick-offs.

12 Claims, 2 Drawing Figures

DYNAMICALLY TUNED GYROSCOPES

BACKGROUND OF THE INVENTION

This invention relates to gyroscopes.

The invention is more particularly concerned with dynamically tuned gyroscopes.

Dynamically tuned gyroscopes have an inertia member such as a ring which is suspended, for limited displacement about two axes, relative to a rigidly-mounted rotating shaft. The inertia ring is rotated with the shaft and at its tuned speed effectively becomes decoupled from the shaft, behaving as though freely suspended in space.

Previous dynamically tuned gyroscopes have a central shaft that is driven for rotation about its axis by a suitable motor, and that is rigidly mounted with the gyroscope casing by means of, for example, a pair of ball-race bearings. In such gyroscopes the shaft projects at one end beyond the bearings so as to overhang them, and this projecting end of the shaft supports a gimbal ring coaxial with the shaft. The gimbal ring is resiliently mounted with the shaft by some form of torsional spring (such as, for example, a pair of flexure pivots) extending between opposite sides of the shaft and the inner surface of the ring, so that it is free for angular displacement, to a limited extent, about an axis at right angles to the shaft axis. The gimbal ring, in turn, supports the inertia ring by means of torsional springs that extend between the outer surface of the gimbal ring and the inner surface of the inertia ring, and that are located orthogonally with respect to the springs supporting the gimbal ring. In this way, the inertia ring is free for angular displacement relative to the gimbal ring about an axis at right angles to the axis of rotation of the gimbal ring relative to the shaft. The inertia ring is thereby free for rotation about two orthogonal axes relative to the axis of rotation of the shaft.

In operation, the inertia ring spins at high speed about the shaft axis and, because of its angular momentum, tends to resist changes in its attitude. If the gyroscope is displaced through a small angle relative to a non-rotating reference frame, the inertia ring will tend to maintain the attitude it had prior to displacement, thereby causing relative displacement between the inertia ring and the gimbal ring, and between the gimbal ring and the shaft. There is, in effect, a dynamically induced spring rate between the inertia ring and the shaft. It can be shown that this spring rate has a negative coefficient and is a function of the gimbal ring inertia and the square of the rotational speed of the shaft. If the positive spring rate of the torsional spring is chosen to cancel the dynamically induced negative spring rate, then the behaviour of the inertia ring is approximately that of a free rotating body in space.

In practice, because the inertia and gimbal rings can only be displaced through small angles relative to one another, and to the shaft, the gyroscopes usually function in a feedback fashion whereby a measure is taken of the force required to maintain the inertia ring in the same position relative to the gyroscope casing. This is usually done by supplying current to torque coils acting on the inertia ring, and measuring the current necessary to maintain a constant, preferably near zero, output from displacement pick-offs associated with the ring.

Such previous arrangements have several disadvantages which arise particularly from the manner in which the inertia ring is mounted relative to the shaft. The main disadvantage arises from the overhung configuration of the inertia ring whereby it is mounted at one end of the shaft outside the two bearings supporting the shaft. With this configuration, the mass of the gimbal ring, the inertia ring, the shaft and the torsional springs exerts a force on the bearings that is increased by the leverage of the shaft. This can cause strain on the bearings, especially at high speed, and also makes the assembly more susceptible to vibration effects and noise. With this overhung configuration, cantilever displacement of the inertia ring mounting caused by, for example, vibration, acceleration or gravity will give a differential output from the pick-offs, of the same kind as would occur with rotation of the gyroscope about its input axes. This results in a correction current being supplied to the torque coils and therefore in an error in the output of the gyroscope. Previous configurations are also relatively bulky and of complex construction.

BRIEF SUMMARY OF THE INVENTION

It is an object of the present invention to provide a gyroscope that can be of compact configuration and that can be used to alleviate the above-mentioned disadvantages.

According to the present invention, there is provided gyroscope apparatus including a rotatable member that is supported at spaced locations along its length for rotation about its axis, gimbal means mounted with the rotatable member by first resilient means for angular displacement relative to the rotatable member about an axis at right angles to the axis of the rotatable member, and an inertia member mounted with the gimbal means by second resilient means for angular displacement relative to the gimbal means about an axis at right angles to the axis of angular displacement of the gimbal means, wherein the gimbal means is arranged to extend about the rotatable member, and the first resilient means is mounted with the rotatable member intermediate said spaced locations.

In this way it is possible to eliminate any overhang.

The spaced locations may be at opposite ends of the rotatable member. The gimbal means and the inertia member may be of substantially annular form arranged substantially concentrically with one another. In such an arrangement, the major part of the first and second resilient means may be contained within the radial thickness of the gimbal means, thereby producing a compact configuration. The gyroscope apparatus may include pick-off means arranged to sense displacement of the inertia member, and torquer means arranged to apply a restoring force to the inertia member, the torquer means being located further away from the axis of the rotatable member than are said pick-off means. In this way a large restoring force may be produced for a given power supplied to the torquer means.

A dynamically tuned gyroscope, in accordance with the present invention, will now be described, by way of example, with reference to the accompanying drawings.

DETAILED DESCRIPTION

Figure 1:
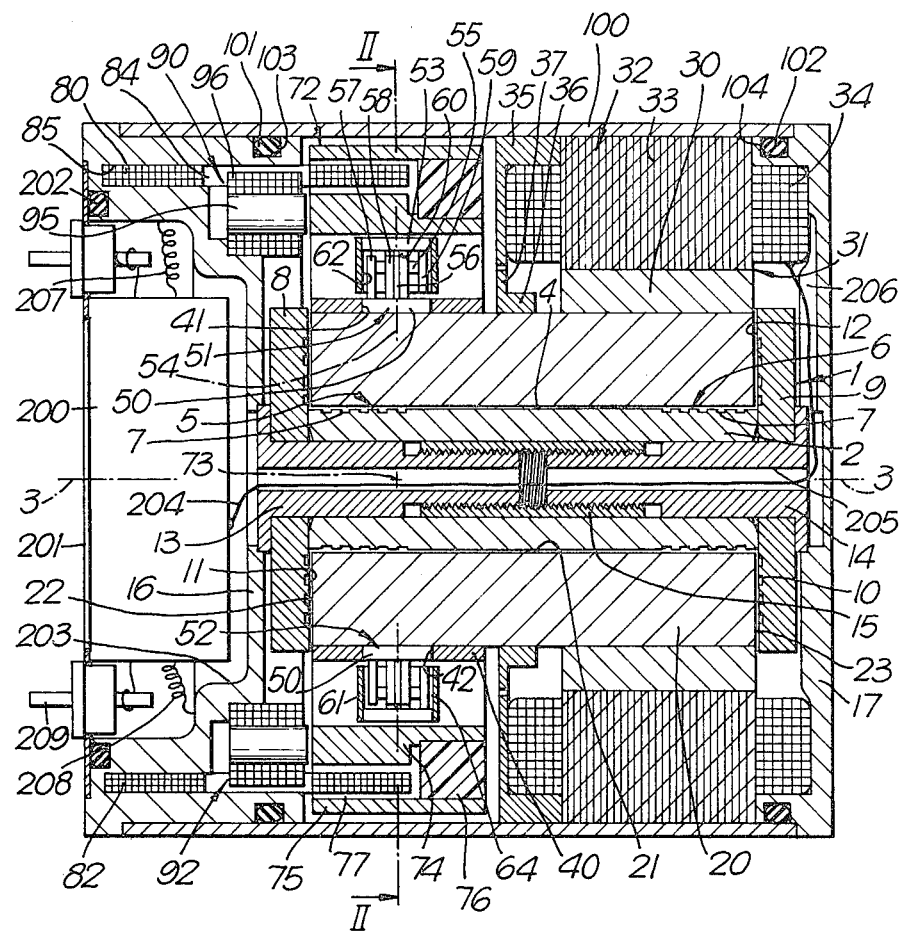
FIG. 1 is a cross-sectional elevation along the length of the gyroscope.

The gyroscope has a gas-lubricated bearing assembly 1 including a tubular journal shaft 2 of boron carbide that extends along a central axis 3 of the gyroscope. The journal shaft 2 is formed on its outer curved surface 4 with two regions 5 and 6 of shallow helical grooves 7 in a herring-bone configuration, shown to an enlarged scale in FIG. 1. The bearing 1 also has two flat, circular thrust plates 8 and 9 which are also of boron carbide and each of which has a number of logarithmic spiral grooves 10 formed on one face 11 and 12 respectively. The two thrust plates 8 and 9 are rigidly clamped at opposite ends of the journal shaft 2, with their grooved faces 11 and 12 facing one another, by means of two steel screws 13 and 14 respectively. The screws 13 and 14 extend into the bore of the shaft 2 and engage with opposite ends of an internally threaded sleeve 15 located within the bore. The journal shaft 2 and thrust plates 8 and 9 are supported rigidly within the gyroscope by means of two steel end flanges 16 and 17 which engage the outer ends of the screws 13 and 14 respectively.

The gas-lubricated bearing 1 is completed by a tubular rotor 20 of boron carbide which embraces the journal shaft 2. The rotor 20 has a central bore 21 with a smooth surface that cooperate with the grooved regions 5 and 6 on the shaft 2 such that, when the rotor is rotated, a gas film is built up between the surface of the bore 21 and the curved surface of the shaft so as thereby to separate and reduce the friction between them. The rotor 20 has optically-flat end surfaces 22 and 23 which similarly cooperate with the grooved surfaces 11 and 12 of the thrust plates 8 and 9 respectively to produce a gas film between them. Further details of the operation and construction of gas-lubricated bearings of this form are given in, for example, U.K. Pat. Nos. 1,310,523, 1,310,524, 1,310,525 and 1,310,526, each of which is assigned to the assignee of the present application, and the disclosures of which are incorporated herein by reference.

A steel alloy hysteresis ring 30 embraces the right-hand end of the rotor 20 and is secured thereto by means of a suitable adhesive. The hysteresis ring 30 forms a part of an electric motor 31 which also includes a stator assembly 32 mounted on the end flange 17. The stator assembly 32 is of annular form, extending around the hysteresis ring 30, and comprises a laminated core 33 and electrical windings 34. The core 33 is separated from the hysteresis ring 30 by a small gap sufficient to permit free running of the rotor 20. To aid dissipation of heat from the motor coils 34, the stator assembly 32 is a close fit with the end flange 17; any interstices between the two components may be filled with a heat-conductive adhesive. The effects of any stray magnetic fields from the motor 31 are reduced by use of an annular magnetic shield 35 of L-shape in cross-section, which contacts the inner surface of a tubular outer housing 100 of the gyroscope. The shield 35 is secured with adhesive to the side of the laminated core 33 and extends radially inwards on one side of the windings 34. A second annular magnetic shield 36 is secured to the rotor 20 and has a radially projecting flange 37 that is aligned with the other shield 35. The second shield 36 rotates with the rotor 20 and is separated from the fixed shield 35 by a narrow annular gap sufficient to permit free rotation.

A slim metal mounting sleeve 40 is also secured about the rotor 20, at the opposite end to the hysteresis ring 30. The mounting sleeve 40 has two circular apertures 41 and 42 formed through its wall and located diametrically opposite one another. The apertures 41 and 42 serve to retain the inner end 50 of two flexure pivot assemblies 51 and 52 respectively such that the assemblies project radially outwardly of the sleeve 40.

The flexure pivot assemblies 51 and 52 may be of the kind shown and described in detail in U.K. Pat. No. 1,545,774 which is assigned to the assignee of the present application, and the disclosure of which is incorporated herein by reference. Briefly, these flexure pivot assemblies have two circular mounting plates 50 and 53 which are resiliently interconnected with one another to permit limited relative angular displacement between them about an axis 54. More particularly, the assemblies 51 and 52 have a pair of crossed leaf springs 55 and 56, one end of which is held between a pair of pins 57 and 58 supported by one mounting plate 50, and the other end of which is held between a pair of pins 59 and 60 supported by the other mounting plate 53.

Figure 2:
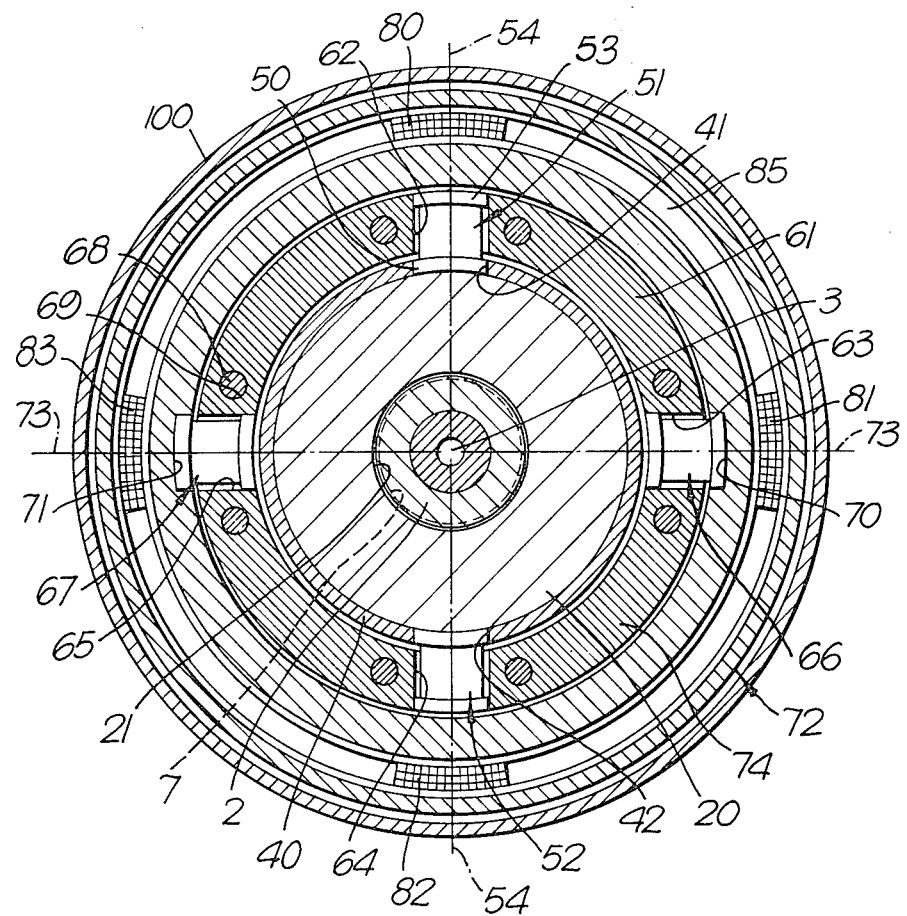
FIG. 2 is a cross-sectional view across the diameter of the gyroscope along the line II—II.

The outer mounting plates 53 of the flexure pivot assemblies 51 and 52 are secured to a gimbal ring 61. The gimbal ring 61 concentrically encircles the mounting sleeve 40 and the rotor 20, and has four radially-extending circular holes 62 to 65 (FIG. 2) formed at equally-spaced intervals about the gimbal ring. The gimbal ring 61 is mounted with the rotor 20 for limited angular displacement about the axis 54, at right angles to the rotor axis 3, by means of the two flexure pivot assemblies 51 and 52. More particularly, the outer mounting plates 53 of the flexure-pivot assemblies 51 and 52 are brazed in the outer end of the holes 62 and 64 such that the ends of the mounting plates are flush with the outer surface of the gimbal ring 61. In this way, the separation between the gimbal ring 61 and the mounting sleeve 40 is reduced to a minimum, thereby leading to a compact configuration. Containing the major part of the length of the flexure-pivot assemblies 51 and 52 within the radial thickness of the gimbal ring 61 also protects the flexure-pivot assemblies and reduces aerodynamic resistance to rotation.

A further two flexure-pivot assemblies 66 and 67 (FIG. 2) are mounted with the gimbal ring 61, in the holes 63 and 65 respectively. These further pivot assemblies 66 and 67 extend radially outwards from the gimbal ring 61 having their inner mounting plates 50 brazed into the holes 63 and 65 such that the end surfaces are flush with the inner surface of the gimbal ring. The outer mounting plates 53 of the assemblies 66 and 67 are brazed into holes 70 and 71 respectively in the inner surface of an inertia ring 72. The inertia ring 72 extends concentrically about the gimbal ring 61, the flexure pivot assemblies 66 and 67 serving to mount the inertia ring for limited angular displacement about an axis 73 at right angles to the gimbal displacement axis 54 and to the rotor axis 3. The separation between the inertia ring 72 and the gimbal ring 61 can be small because a major part of the length of the flexure pivot assemblies 66 and 67 is contained within the thickness of the gimbal ring.

The gimbal ring 61 has eight grub screws 68 located in pairs on either side of the flexure pivot assemblies 51,52,66 and 67. The screws 68 are screwed into tapped holes 69 so that the balance of the gimbal ring 61 can be adjusted by screwing into or out of the tapped holes.

The inertia ring 72 is formed of three parts: an inner metal sleeve 74 that is separated from an outer metal sleeve 75 by a rare-earth magnet 76 of annular shape. The magnet 76 is secured, by means of an adhesive, to extend between one end of the inner and outer sleeves 74 and 75 such as thereby to form an annular recess 77 at the other end of the inertia ring 72. The lines of force of the magnet 76 are directed radially, the inner and outer sleeves 74 and 75 of the inertia ring 72 acting as magnet endpieces so that the lines of magnetic force are thereby directed radially across the annular recess 77.

Four electrical torque coils 80 to 83 are mounted on the left end flange 17 and project within the annular recess 77 of the inertia ring 72. The coils 80 to 83 are each of a rectangular configuration having an open center 84. The axes of the windings of the coils 80 to 83 extend radially of the gyroscope and the coils are equally spaced about the left end flange 16. The major part of each coil is fitted into an annular groove 85 in the left end flange 16 and the remainder of each coil projects into the annular recess 77 in the inertia ring 72.

Mounted close to each torque coil 80 to 84 is a pick-off assembly 90 to 93 which are responsive to displacement of the inertia ring 72 about the axis 54 or the axis 73. The torque coils 80 and 84 are mounted outwardly of the pick-off assemblies 90 to 93, that is, they are located further away from the axis 3 than the pick-off assemblies. In this way, because of the greater leverage, less power is required to provide an equivalent torque than would be the case with torque coils mounted closer to the axis 3, on the opposite side of the pick-off assemblies 90 to 93. Locating the torque coils 80 to 84 close to the outside of the gyroscope also improves cooling of the coils.

The pick-off assemblies 90 to 93 are of conventional form each comprising a cylindrical soft iron core 95 surrounded by helical windings 96. The diameter of the core 95 is substantially equal to the thickness of the inner sleeve 74 of the inertia ring 72, each core being aligned with the edge of the inner sleeve and separated from it by a small gap. The windings 96, at their outer part, project within the open center 84 of the torque coils 80 to 83. A heat-conductive cement fills the center 84 of the torque coils 80 to 83, any recesses between the pick-off assemblies 90 to 93 and the end flange 17, and any recesses between the torque coils and the end flange, so as thereby to promote dissipation of heat from the torque coils and the pick-off assembly windings 96.

The outer housing 100 is in the form of a tubular metal shell that extends between the end flanges 16 and 17 and is sealed with them by means of O-rings 101 and 102, which lie in annular grooves 103 and 104 respectively around the outer surface of the flanges, and by means of a capillary sealant composition applied between the shell and end flanges. The tubular shell 100 is contacted internally along a major part of its length, thereby leading to improved dissipation of heat from the motor 31 and a consequent reduction in thermal gradients within the gyroscope.

The gyroscope also includes an electronics unit 200 which is mounted on a circular cover plate 201. The cover plate 201 is sealed with the flat end face of the left-end flange 16 by means of an O-ring 202 such that the electronics unit 200 lies in a well 203 formed by the end flange. The electronics unit 200 controls energization of the motor windings 34 and the torque coils 80 to 83, and also receives the output of the pick-off assemblies 90 to 93. Electrical connection to the motor windings 34 is made by means of a lead 204 which extends from the electronics unit 200 through a bore 205 in the screws 13 and 14 and along a groove 206 in the right end flange 17. The bore through the left screw 13 is filled with a suitable sealing compound (not shown) so as to prevent entry of dust, moisture and other contaminants. Connection to the torque coils 80 to 83 is made by leads 207 (only one of which is shown) which extend through sealed passages (not shown) in the left end flange 16. Similarly, connection is made to the pick-off assemblies 90 to 93 by leads 208.

The cover plate 201 carries electrical terminals 209 (only two of which are shown) which make connection with the electronics unit 200 and to which external electrical connection of the gyroscope is made.

In operation, the motor windings 34 are suitably energized to cause high speed rotation of the rotor 20, the gimbal ring 61 and the inertia ring 72 about the gyroscope axis 3. The speed of rotation is chosen to be that at which the inertia ring 72 becomes decoupled from the rotor 20, that is, in which the inertia ring becomes dynamically tuned and behaves as though freely floating in space. The gyroscope may additionally include suitable rotational speed pick-offs to indicate the speed of the inertia ring 72 so that correction may be applied to ensure the correct running speed. The output of the displacement pick-off assemblies 90 to 93 remain constant and identical, and the torque coils 80 to 83 remain unenergized, so long as the gyroscope is not moved in such a way as to have a component of displacement about an axis at right angles to the rotational axis 3.

If, however, for example, the gyroscope is moved such as to have a component of displacement clockwise about the axis 73, the inertia ring 72 will tend to maintain its original attitude and will thereby be displaced anti-clockwise relative to the gyroscope housing. In this way, the inertia ring 72 will be displaced towards the pick-off assembly 90 and away from the pick-off assembly 92, although it will remain at substantially the same separation from the other pick-off assemblies 91 and 93. The output of the pick-off assemblies 90 and 92 will therefore change differentially, indicating displacement about the axis 73.

Similarly, if the gyroscope is moved such as to have a component of displacement about the axis 54, the inertia ring will tend to maintain its original attitude and will thereby be displaced towards one of the pick-off assemblies 91 and 93, and away from the other assembly.

As soon as a differential change in the output of opposite pick-off assemblies 90 and 92, or 91 and 93 is sensed, current is supplied in the appropriate sense to corresponding torque coils 80 and 82, or 81 and 83 so as to restore the inertia ring 72 to its original position relative to the gyroscope housing.

By replacing the conventional rotating shaft of previous dynamically tuned gyroscopes by a rotor 20 of tubular form that is supported from within by, for example, a gas-lubricated bearing, the gimbal ring 61 and inertia ring 72 can be mounted directly on the rotating member intermediate its supported ends. It can be seen therefore that the problems of stress, vibration and noise that may occur with previous gyroscopes of the overhung configuration is substantially reduced in the present arrangement. Furthermore, by mounting the flexure pivot assemblies 51, 52, 66 and 67 to extend within the radial thickness of the gimbal ring 61, the diameter of the gyroscope can be kept to a minimum thereby giving a compact overall configuration. The gyroscope design has high symmetry and a low number of component parts, the majority of which are of simple geometric shape and consequently can be manufactured to high accuracy inexpensively.

What I claim is:

1. Gyroscope apparatus comprising: a rotatable member; first and second bearing means supporting the rotatable member from within at opposite ends thereof for rotation about its axis of rotation; first resilient means mounted with said rotatable member at a first point along its length intermediate said ends; gimbal means extending about said rotatable member, said gimbal means being mounted with said resilient means for angular displacement relative to said rotatable member about a first axis at right angles to the axis of rotation of the rotatable member; second resilient means mounted with said gimbal means; an inertia member mounted with said second resilient means for angular displacement relative to said gimbal means about a second axis at right angles to said first axis; drive means for rotating said rotatable member about its axis of rotation; and means mounting said drive means with said rotatable member at a second point along its length intermediate said first point and one of said bearing means.

2. Gyroscope apparatus according to claim 1 wherein said gimbal means and said inertia member are of substantially annular form and are located substantially concentrically with one another.

3. Gyroscope apparatus according to claim 1 wherein said gimbal means is of substantially annular form and wherein the major part of said first and second resilient means are contained within the radial thickness of the gimbal means such that angular displacement of said inertia member about said first or second axis causes rotational displacement of one or other of said pairs of flexure pivots within said gimbal means.

4. Gyroscope apparatus according to claim 1 wherein said rotatable member is of tubular form.

5. Gyroscope apparatus according to claim 1 or 4 wherein said drive means comprises: a hysteresis member; means mounting said hysteresis member on said rotatable member; electrical motor stator means; and means mounting said stator means for cooperation with said hysteresis member.

6. Gyroscope apparatus according to claim 1 wherein said first and second bearing means are provided by a gas-lubricated bearing assembly.

7. Gyroscope apparatus according to claim 1 wherein said gimbal means and said drive means are mounted with said rotatable member close to opposite ends of said rotatable member.

8. Gyroscope apparatus according to any one of claims 1, 4, 6 or 7 including pick-off means for sensing angular displacement of said inertia member, torquer means for applying a restoring force to the inertia member, and means mounting said torquer means further away from the axis of the rotatable member than the said pick-off means.

9. Gyroscope apparatus according to any one of claims 1, 4, 6 or 7 wherein said first and second resilient means are flexure pivots.

10. Gyroscope apparatus according to claim 9 wherein said first resilient means are a first two flexure pivots located on said rotatable member diametrically opposite one another, and said second resilient means are a second two flexure pivots located on the gimbal means diametrically opposite one another intermediate the first two flexure pivots.

11. Gyroscope apparatus comprising: a tubular rotor; first and second bearing means supporting the rotor from within at opposite ends thereof for rotation about its axis; a gimbal ring encircling said rotor; a first two flexure pivots; means mounting one end of said first two flexure pivots with said rotor at a first point close to one end of said rotor and diametrically opposite one another intermediate the ends of the rotor for angular displacement about an axis at right angles to the rotor axis; means mounting the other end of said first two flexure pivots with said gimbal ring, the major part of the length of said first two flexure pivots being contained within the radial thickness of the gimbal ring; an inertia ring encircling said gimbal ring; a second two flexure pivots; means mounting one end of said second two flexure pivots with said gimbal ring diametrically opposite one another intermediate said first two flexure pivots for angular displacement of said inertia ring about an axis at right angles to the rotor axis and to the axis of displacement of the gimbal ring; and electrical motor means for rotating said rotor about its axis, said motor means comprising a hysteresis member; means mounting said hysteresis member on said rotor close to its other end and intermediate said first point and said other end, stator means, and means mounting said stator means for cooperation with said hysteresis member.

12. Gyroscope apparatus according to claim 11 including pick-off means for sensing angular displacement of said inertia ring, torquer means for applying a restoring force to the inertia ring, and means mounting said torquer means further away from the axis of the rotatable member than the said pick-off means.

* * * * *